United States Patent
Heathman et al.

(10) Patent No.: US 7,128,142 B2
(45) Date of Patent: Oct. 31, 2006

(54) APPARATUS AND METHODS FOR IMPROVED FLUID DISPLACEMENT IN SUBTERRANEAN FORMATIONS

(75) Inventors: James F. Heathman, Katy, TX (US); Sears T. Dealy, Comanche, OK (US); James H. Cantrell, Duncan, OK (US); Dennis W. Gray, Comanche, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 0 days.

(21) Appl. No.: 11/211,975

(22) Filed: Aug. 24, 2005

(65) Prior Publication Data
US 2006/0060381 A1    Mar. 23, 2006

Related U.S. Application Data

(60) Provisional application No. 60/603,947, filed on Aug. 24, 2004.

(51) Int. Cl.
*E21B 49/08* (2006.01)
*E21B 41/00* (2006.01)

(52) U.S. Cl. .................. 166/53; 166/66; 166/90.1; 166/75.11; 166/250.01; 166/250.14; 175/40; 175/48; 73/61.56; 73/152.39

(58) Field of Classification Search .................. 166/53, 166/66, 90.1, 75.11, 75.12, 250.01, 250.07, 166/250.14, 291, 312, 371; 73/61.56, 61.59, 73/152.39, 152.55; 175/40, 48, 49; 422/82.02
See application file for complete search history.

(56) References Cited

U.S. PATENT DOCUMENTS

| | | | |
|---|---|---|---|
| 3,286,510 A * | 11/1966 | Parker ...................... | 73/54.02 |
| H001932 H * | 1/2001 | Heathman et al. ...... | 166/250.14 |
| 6,767,877 B1 * | 7/2004 | Kuo et al. .................. | 510/175 |
| 2004/0258609 A1 * | 12/2004 | Boren et al. ................ | 423/605 |

* cited by examiner

*Primary Examiner*—George Suchfield
(74) *Attorney, Agent, or Firm*—Craig W. Roddy; Baker Botts L.L.P.

(57) ABSTRACT

Apparatus and methods for determining suitable displacement fluids for use in subterranean cementing operations, and methods of cementing that use such displacement fluids, are provided. Examples of apparatus include apparatus for evaluating fluids. An example of a system is a system for inverting an oleaginous-external/aqueous-internal fluid in a well bore in a subterranean formation.

20 Claims, 6 Drawing Sheets

APPARATUS AND METHODS FOR IMPROVED FLUID DISPLACEMENT IN SUBTERRANEAN FORMATIONS

CROSS-REFERENCE TO RELATED APPLICATION

The present application claims priority under 35 U.S.C. § 119(e) from U.S. Provisional Patent Application No. 60/603,947, entitled "APPARATUS AND METHODS FOR IMPROVED FLUID DISPLACEMENT IN SUBTERRANEAN FORMATIONS," and filed on Aug. 24, 2004, the disclosures of which are incorporated herein by reference in their entirety.

This application is also related to co-pending U.S. patent application Ser. No. 11/211,974, entitled "Apparatus and Methods for Improved Fluid Displacement in Subterranean Formations," filed on the same day herewith, the entirety of which is herein incorporated by reference.

BACKGROUND

The present invention relates generally to subterranean operations involving displacement fluids and water-wetting surfaces within a subterranean formation. More particularly, the present invention relates to apparatus and methods for determining suitable displacement fluids for use in subterranean cementing operations, and methods of cementing that use such displacement fluids.

The drilling of well bores in subterranean formations commonly involves pumping a "drilling fluid" into a rotated drill string to which a drill bit is attached. The drilling fluid typically exits through openings in the drill bit, inter alia, to lubricate the bit and to carry cuttings up an annulus between the drill string and the well bore for disposal at the surface. One type of drilling fluid is an emulsion of substances that define a non-aqueous external phase and an aqueous internal phase. In this drilling fluid a non-aqueous "oleaginous" external phase (e.g., oil or synthetic polymers) may be used to inhibit swelling of water-sensitive drill cuttings (e.g., shale). Typical oil-based drilling fluids contain some amount of an internal aqueous phase. The emulsion often may be prepared by using an aqueous (water-based) internal phase comprising salts (e.g., calcium chloride). These oil- or synthetic-based drilling fluids also typically include chemical emulsifying agents that act to form oleaginous external phase emulsions, also known as "invert" emulsions. These chemical emulsifying agents also promote the oil-wetting of surfaces. This oil-wetted state promotes lubrication of the drill bit and further stabilization of formation materials.

After drilling is completed, a casing string commonly is cemented in the well bore as part of completing the well. One type of cementing operation includes placing a cement composition through the casing string and into the annulus to displace the drilling fluid from the annulus to the surface (however, flow in the opposite direction can occur in some operations, such as in reverse circulating or reverse cementing). A successful cementing operation also includes bonding the cement composition with the outer surface of the casing string and the inner surface of the well bore defining the annulus.

The bond formed between the cement composition and the outer surface of the casing string as well as the inner surface of the well bore may not be optimal if the casing string and well bore surfaces are not conducive to bonding with the cement composition. For example, the non-aqueous portion of the drilling fluid may coat the casing string and well bore surfaces. This may interfere with the bonding of the cement composition to the surfaces, because the aqueous cement composition generally will not bond readily with the non-aqueous substances that may coat the surfaces. If improper or incomplete bonding occurs at either of these surfaces, a thin region called a "micro-annulus" may be formed. Formation of a micro-annulus may lead to the loss of zonal isolation of the well bore, and undesirable fluid migration along the well bore casing string. Further, casing lifetime may be compromised if migrating fluids are corrosive.

Conventional attempts to solve this problem have involved displacement of the drilling fluid from the annular space between the formation and casing string, or between an inner casing and an outer casing strings so as to water-wet the formation and/or casing surfaces. Accordingly, it often may be desirable for the displacement fluid to invert the emulsion within the drilling fluid, while water-wetting the formation and/or casing surfaces.

A displacement fluid may be pumped ahead of the cement composition to create water-wet surfaces. Certain embodiments of such displacement fluids may cause a non-aqueous (hereafter "oleaginous") external drilling fluid to invert, such that the aqueous internal phase becomes external, and the oleaginous phase becomes internal. Fluids that cause this inversion may be referred to as "inverter fluids," and often may be suitable for use as displacement fluids. Examples of suitable inverter fluids include, inter alia, spacers and/or preflushes. Other nonlimiting examples of suitable inverter fluids include settable fluids and other compositions that comprise cementitious components such as hydraulic cements. Other nonlimiting examples of suitable inverter fluids are disclosed in, for example, U.S. Pat. Nos. 6,138,759, 6,524,384, 6,666,268, 6,668,929, and 6,716,282, the entire disclosures of which are incorporated herein by reference.

Conventional inverter fluids typically comprise an aqueous base fluid, viscosifying agents, and fluid loss control additives. Certain inverter fluids also may comprise, inter alia, weighting agents, surfactants, and salts. The weighting agents may be included in an inverter fluid, inter alia, to increase its density for well control, and to increase the buoyancy effect that the inverter fluid may impart to the drilling fluid and filter cake that may adhere to the walls of the well bore. Viscosifying agents may stabilize the suspension of particles within the inverter fluid, and may control fluid loss from the inverter fluid. The presence of a surfactant in the inverter fluid may enhance the chemical compatibility of the inverter fluid with other fluids (e.g., the drilling fluid, and/or a cement composition that subsequently may be placed within the formation) and may water-wet downhole surfaces, thereby improving bonding of the cement composition to surfaces in the formation, and may facilitate improved removal of well bore solids. A salt may be included in the inverter fluid, inter alia, for formation protection, improved compatibility among fluids in the formation, and to desirably affect wettability.

Inverter fluids also may be used to displace oleaginous-external/aqueous-internal fluids from cased hole or open hole well bores in operations other than cementing. One example involves replacement of these inverter fluids with a completion fluid (e.g., a solution of calcium chloride or bromide). This operation may be conducted to clean the well bore for further operations, such as perforation of the casing or, in the case of an open hole, the onset of production of the well. In this case, the inverter fluid may serve to displace the previous fluid and leave the formation surfaces in a water-wet state.

The use of inverter fluids in cementing and other subterranean operations often may be problematic, because of, inter alia, difficulties in identifying a specific inverter fluid composition that may desirably invert a particular drilling fluid composition in a manner so as to water-wet the annulus to a desired degree. Conventional attempts to identify specific inverter fluid compositions that may desirably invert a particular drilling fluid composition in a desired manner, at the temperature and pressure to which both fluids may be exposed in a subterranean formation, often have involved a multi-step process that may fail to identify incompatibilities between components of the fluids at the anticipated subterranean conditions. Commonly, a proposed inverter fluid composition has been pre-conditioned to the anticipated temperature and pressure using a high-pressure, high-temperature apparatus, then cooled, de-pressurized, and removed from the first apparatus, and placed in a testing apparatus at atmospheric pressure and only slightly elevated temperature, along with a sample of the drilling fluid that is to be inverted. This method is problematic because it may mask certain changes or conditions (e.g., cloud point changes, solubility changes, and the like) that may result in an incompatibility between the fluids and/or that may indicate that the proposed inverter fluid composition will not invert a particular drilling fluid composition in a desired manner at the desired temperature and pressure.

SUMMARY

The present invention relates generally to subterranean operations involving displacement fluids and water-wetting surfaces within a subterranean formation. More particularly, the present invention relates to apparatus and methods for determining suitable displacement fluids for use in subterranean cementing operations, and methods of cementing that use such displacement fluids.

An example of an apparatus of the present invention is an apparatus for evaluating fluids, comprising: a sealed vessel comprising: a shell having an upper end and a lower end; an upper head affixed to the upper end; and a lower head affixed to the lower end; a mixing means disposed within the vessel such that at least a portion of the mixing means is immersed within a fluid disposed within the vessel; a pressure controlling means comprising: a pressure sensing means capable of converting the pressure within the vessel to a signal; a pressure adjusting means capable of changing the pressure within the vessel; and a controlling means in signal communication with the pressure sensing means and the pressure adjusting means, wherein the controlling means commands the pressure adjusting means in response to signals from the pressure sensing means; a temperature controlling means comprising: a temperature sensing means capable of converting the temperature of a fluid disposed within the vessel to a signal; a heating means capable of changing the temperature of the fluid disposed within the vessel; and a controlling means in signal communication with the temperature sensing means and the heating means, wherein the controlling means commands the heating means in response to signals from the temperature sensing means; a conductivity measuring means capable of converting the conductivity of a fluid disposed within the vessel to a signal that enables an operator to evaluate the fluid.

Another example of an apparatus of the present invention is an apparatus for evaluating fluids, comprising: a vessel comprising: a shell having an upper end and a lower end; an upper head affixed to the upper end; and a lower head affixed to the lower end; a mixer disposed within the vessel such that at least a portion of the mixer is immersed within a fluid disposed within the vessel; a pressure controller comprising: a pressure sensor capable of converting the pressure within the vessel to a signal; a pressure adjuster capable of changing the pressure within the vessel; and a controller in signal communication with the pressure sensor and the pressure adjuster, wherein the controller commands the pressure adjuster in response to signals from the pressure sensor; a temperature controller comprising: a temperature sensor capable of converting the temperature of a fluid disposed within the vessel to a signal; a heating element capable of changing the temperature of the fluid disposed within the vessel; and a controller in signal communication with the temperature sensor and the heating element, wherein the controller commands the heating element in response to signals from the temperature sensor; and a conductivity sensor disposed within the vessel such that at least a portion of the conductivity sensor is immersed within a fluid disposed within the vessel, the conductivity sensor being capable of converting the conductivity of a fluid disposed within the vessel to a signal that enables an operator to evaluate the fluid.

An example of a system of the present invention is a system for inverting an oleaginous-external/aqueous-internal fluid in a well bore in a subterranean formation, comprising: a test apparatus for evaluating inverter fluids, the test apparatus comprising: a vessel comprising: a shell having an upper end and a lower end; an upper head affixed to the upper end; and a lower head affixed to the lower end; a mixer disposed within the vessel such that at least a portion of the mixer is immersed within a fluid disposed within the vessel; a pressure controller comprising: a pressure sensor capable of converting the pressure within the vessel to a signal; a pressure adjuster capable of changing the pressure within the vessel; and a controller in signal communication with the pressure sensor and the pressure adjuster, wherein the controller commands the pressure adjuster in response to signals from the pressure sensor; a temperature controller comprising: a temperature sensor capable of converting the temperature of a fluid disposed within the vessel to a signal; a heating element capable of changing the temperature of the fluid disposed within the vessel; and a controller in signal communication with the temperature sensor and the heating element, wherein the controller commands the heating element in response to signals from the temperature sensor; and a conductivity sensor disposed within the vessel such that at least a portion of the conductivity sensor is immersed within a fluid disposed within the vessel, the conductivity sensor being capable of converting the conductivity of a fluid disposed within the vessel to a signal that enables an operator to evaluate the fluid; a fluid supply that comprises an inverter fluid, the inverter fluid composition having been chosen by an operator using the test apparatus; and a pump to inject the inverter fluid into a well bore in a subterranean formation so as to invert an oleaginous-external/aqueous-internal fluid disposed in the well bore, the pump being in fluid communication with the fluid supply and the well bore.

The features and advantages of the present invention will be readily apparent to those skilled in the art upon a reading of the description of the preferred embodiments, which follows.

BRIEF DESCRIPTION OF THE DRAWINGS

A more complete understanding of the present disclosure and advantages thereof may be acquired by referring to the following description taken in conjunction with the accompanying drawings, wherein.

Figure 1:
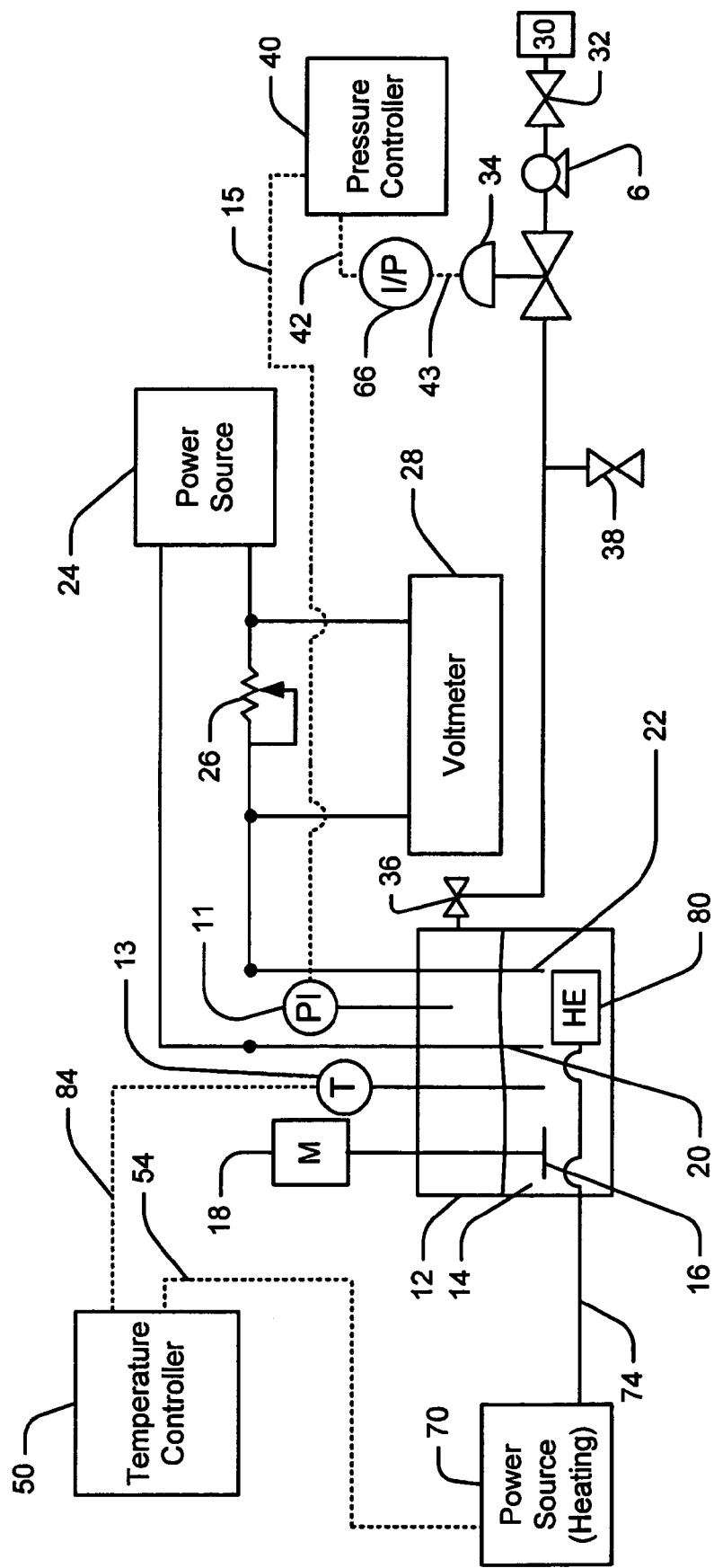
FIG. 1 is a schematic and block diagram for an embodiment of an apparatus of the present invention.

While the present invention is susceptible to various modifications and alternative forms, specific embodiments thereof have been shown in the drawings and are herein described. It should be understood, however, that the description herein of specific embodiments does not limit the invention to the particular forms disclosed, but on the contrary, covers all modifications, equivalents, and alternatives falling within the spirit and scope of the invention as defined by the appended claims.

DETAILED DESCRIPTION

The present invention relates generally to subterranean operations involving displacement fluids and water-wetting surfaces within a subterranean formation. More particularly, the present invention relates to apparatus and methods for determining suitable displacement fluids for use in subterranean cementing operations, and methods of cementing that use such displacement fluids.

In certain embodiments of the present invention, methods are provided for determining a suitable composition for a displacement fluid. In certain embodiments of the present invention, the displacement fluid may be an inverter fluid. Certain embodiments of the methods of the present invention comprise using an apparatus of the present invention to measure a value of a parameter related to the electrical conductivity of an initial mixture of (1) a test fluid having a composition nominally equivalent to the oleaginous external/aqueous internal fluid in the well and (2) part of a selected inverter fluid. Certain embodiments of the methods of the present invention also comprise adding a further portion of the selected inverter fluid to the initial mixture, until the measured value of the parameter indicates the test fluid has inverted from an oleaginous-external/aqueous-internal state to an aqueous-external/oleaginous-internal state.

Referring now to FIG. 1, illustrated therein is a schematic and block circuit diagram for an embodiment of an apparatus of the present invention. A fluid whose electrical conductivity is to be tested is identified by the reference numeral 14. Fluid 14 is placed in a container 12. Generally, container 12 is a pressure vessel. In certain embodiments of the present invention, container 12 may be designed to withstand a pressure of at least about 30,000 psi at a temperature of at least about 400 F. In certain other embodiments of the present invention, container 12 may be designed to withstand greater pressures at the same, or greater, temperature.

In certain preferred embodiments of the present invention, container 12 includes a stainless steel test cell with insulated electrodes and a silicone encased heating jacket.

Within container 12, paddle 16 is disposed in fluid 14. In certain embodiments of the present invention, paddle 16 may comprise a blender blade assembly. In certain embodiments of the present invention, such blender blade assembly may be a blade assembly typical of those used in high-temperature, high-pressure cement consistometers. Paddle 16 can be rotated by electric motor 18, which, in certain embodiments of the present invention, may comprise an AC or DC electric motor. In certain embodiments of the present invention, electric motor 18 may be a direct drive motor, wherein a drive shaft (not shown) penetrates container 12. In certain embodiments of the present invention, electric motor 18 may be a magnetic drive motor, wherein a drive shaft (not shown) does not penetrate container 12. In certain preferred embodiments of the present invention, the speed of electric motor 18 may be indicated in revolutions per minute (rpm) on an indicator (not shown). When fluid 14 within container 12 comprises a mixture of fluids (such as, for example, a test fluid, a portion of an inverter fluid to be tested, and any added substances), the stirring rate achieved using electric motor 18 and paddle 16 should be sufficient to quickly homogenize fluid 14, but should not be so high that excessive shear causes air-entrainment, which may affect readings and surfactant performance.

Thermocouple 13 is disposed within container 12, such that at least a portion of thermocouple 13 is immersed in fluid 14. Two electrodes 20, 22 are immersed in fluid 14 and connected to respective portions of the remaining electrical circuit shown in FIG. 1. Electrodes 20, 22 are mounted through, and insulated from electrical contact with, the side wall of the container 12, and are spaced circumferentially (e.g., about 90°, but other spacings can be used). As container 12 generally will comprise metal, electrodes 20, 22 cannot be allowed to contact the metallic walls of container 12, because contacting the walls can result in erroneous operation. The electrodes 20, 22 may be made of any suitable conductive metals, including, inter alia, iron, brass, nickel or stainless steel. The size of the electrode surface is not critical; in certain preferred embodiments of the present invention, the size of the electrode surface is about 0.2 square inches. Electrode 20 connects to one terminal of a power source 24, and electrode 22 connects to a potentiometer 26 that is connected to another terminal of the power source 24. A voltmeter 28 is connected across the potentiometer 26 to read a voltage across the potentiometer 26 in response to the conductivity of current through fluid 14 from one electrode to the other. The measurement of the voltage, when used in combination with knowledge of the surface area of paddle 16, provides an indication of the degree of resistance faced by paddle 16, which may be transformed into a measurement of the gel strength (measured in pounds per 100 ft$^2$) or the apparent viscosity (measured in Beardon units of consistency) of the fluid 14 within container 12. In certain embodiments of the present invention wherein a measurement of the gel strength is made, paddle 16 may be rotating at about ¼ of one degree per minute. In certain embodiments of the present invention wherein a measurement of the apparent viscosity is made, paddle 16 may be rotating at about 150 rpm. As will be noted later with reference to FIG. 2, certain embodiments of the present invention may employ an ammeter 28' (not shown in FIG. 1) instead of a voltmeter 28, wherein the ammeter 28' may have the same effect as the use of a voltmeter 28, if the voltage across the potentiometer 26 is rectified and conditioned by the components 38 connected to the ammeter 28'.

The pressure within container 12 is indicated by pressure indicator 11, and may be controlled by a variety of means. Generally, the pressure within container 12 will increase as container 12 is heated to a desired temperature. Additional pressurization of container 12 may be achieved by injecting a fluid from fluid supply 30 into container 12 via pump 6. This may be done manually or automatically. When a fluid is injected into container 12 manually, the pressure on pressure indicator 11 may be visually observed, and pressure control valve 34 may be manually opened to permit fluid to be pumped into container 12 through pump 6. In the embodiment illustrated in FIG. 1, the pressure within container 12 may be automatically controlled. In certain of these embodiments wherein the pressure is automatically controlled, pressure indicator 11 comprises a pressure transmitter that sends signal 15 to pressure controller 40. Pressure controller 40 then may compare the pressure in container 12 to a pressure set point, and may send a signal 42 to pressure transducer 66, which may send signal 43 to pressure control valve 34, thereby modulating pressure control valve 34 (e.g., opening it) to permit pump 6 to inject fluid from fluid supply 30 into container 12, until the pressure in container 12 reaches a desired value. Signal 42 may be an electrical signal, while signal 43 may be a pneumatic signal. A bleeder valve 38 optionally may be provided on the piping between pump 6 and container 12. A wide variety of valves may be suitable for use as pressure control valve 34. A wide variety of controllers may be suitable for use as pressure controller 40. In certain embodiments of the present invention, pump 6 may be a diaphragm pump. An example of a suitable diaphragm pump is commercially available from Sprague Corp. In certain embodiments of the present invention (not shown), pump 6 may be relocated such that fluid supply 30 is located between pump 6 and container 12. In these embodiments, fluid supply 30 may comprise a pressure vessel, and pump 6 may cause fluid supply 30 to be pressurized to a desired pressure. In certain embodiments, fluid supply 30 also may comprise a heating element (not shown), such as an external heating jacket, internal heating coils, or the like, that may heat fluid supply 30 to a desired temperature. Where fluid supply 30 is used to pressurize container 12, the fluid within fluid supply 30 generally will have a composition that closely resembles the composition within container 12 (e.g., where fluid 14 within container 12 comprises a particular mixture of inverter fluid and drilling fluid, the fluid within fluid supply 30 may have a composition similar, or identical, to that of the particular mixture of inverter fluid and drilling fluid).

The temperature within container 12 may be controlled by a variety of means. In the embodiment illustrated in FIG. 1, heating element 80 is disposed within container 12. In certain embodiments of the present invention, heating element 80 comprises electrical heating coils. In the embodiment illustrated in FIG. 1, heating element 80 receives electrical current from power supply 70 via conduit 74. Temperature controller 50 receives a signal 84 from thermocouple 13 that indicates the present temperature within fluid 14 in container 12, compares the indicated temperature to the desired temperature, and sends a signal 54 to power supply 70 that modulates the amount of current supplied by power supply 70 so as to elevate, or decrease, the indicated temperature. Signals 54 and 84 may be electrical signals. A wide variety of controllers may be suitable for use as temperature controller 50.

In certain embodiments of the present invention, a receiving tank 99 (not shown) may be provided, and may be connected to container 12 to receive fluid 14 that may be discharged from container 12. In certain embodiments of the present invention wherein a receiving tank 99 is provided, receiving tank 99 generally will be a pressure vessel, and may comprise a cooling element (not shown), such as cooling coils, or the like, along with a number of optional elements such as a temperature indicator (not shown), a pressure controller (not shown), and the like.

Figure 2:
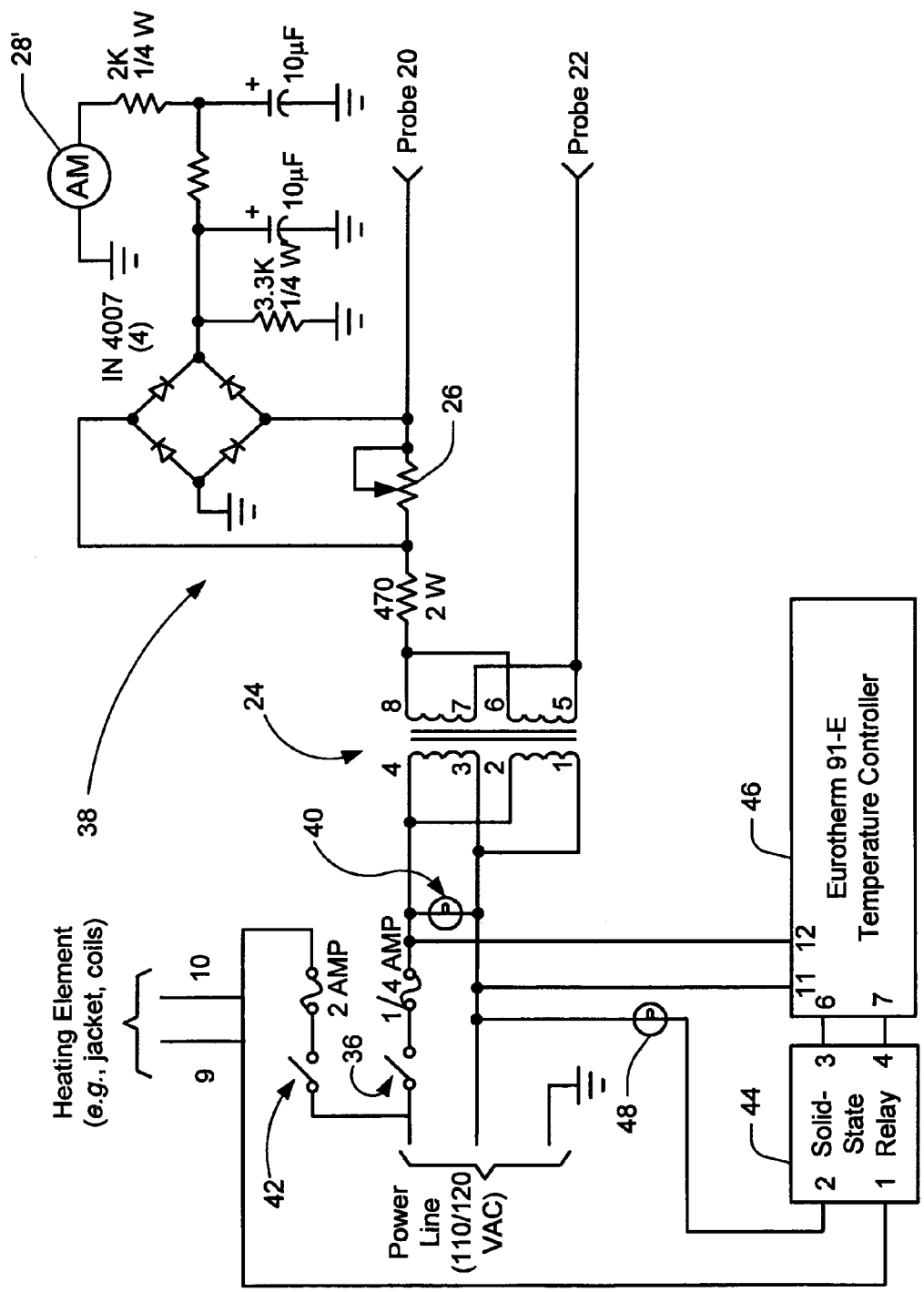
FIG. 2 is a schematic circuit diagram of a particular implementation of a circuit for testing fluid in accordance with the present invention.

Referring now to FIG. 2, a schematic diagram of a circuit for testing a fluid in accordance with one embodiment of the present invention is illustrated. One type of power source 24 is a 24-Vac source such as a STANCOR P8616 transformer from Newark Electronics. A 24-Vac source is preferred, inter alia, for safety purposes, but other alternating current power sources may be used. Direct current sources also may be used, though they are not preferred because electrophoretic mobility of ionic species can cause plating at the electrodes, which may result in the loss of the signal, or interference that may lead to inaccurate measurement. The transformer 24 is energized through an on/off switch 36 connectible to a suitable primary power supply (e.g., a conventional power main).

The potentiometer 26, such as a Bourns 3S00s-2-102, sets the span of readings described below. In the circuit illustrated in FIG. 2, an ammeter 28' (e.g., Monnteck 25-DUA-200-U from Allied) is used instead of a voltmeter. As noted earlier with reference to FIG. 1, the use of an ammeter 28' may have the same effect as the use of a voltmeter 28, if the voltage across the potentiometer 26 is rectified and conditioned by the components 38 connected to the ammeter 28'. Also shown in FIG. 2 is an optional on/off indicating lamp 40 that illuminates when the switch 36 is closed to place the circuit in an operative state for testing in accordance with the present invention.

FIG. 2 also illustrates an example of a heating jacket control circuit that may be used in the apparatus of the present invention. A heating control switch 42 may be used to control a temperature controller 46 that in turn operates a solid-state relay 44, which may energize, or de-energize, the heating jacket 32. A lamp 48 illuminates when the heating jacket 32 is energized (e.g., is providing heat).

The apparatus shown in FIGS. 1–2 measure the surface-acting properties of the fluid 14 by measuring the voltage drop across the potentiometer 26 (measured either directly as a voltage in FIG. 1 or as a resulting current in FIG. 2). Normally, oleaginous-external drilling fluids are not electrically conductive, in contrast to aqueous-based inverter fluids, which are conductive. When the electrodes 20, 22 are coated with a stable, oleaginous-external drilling fluid, the voltage drop across the potentiometer 26 is zero because no current (or an undetectable current) flows between electrodes 20, 22. The maximum voltage drop, which may be obtained when using a conductive inverter fluid by itself as the fluid 14, will be some value above zero.

Figure 3:
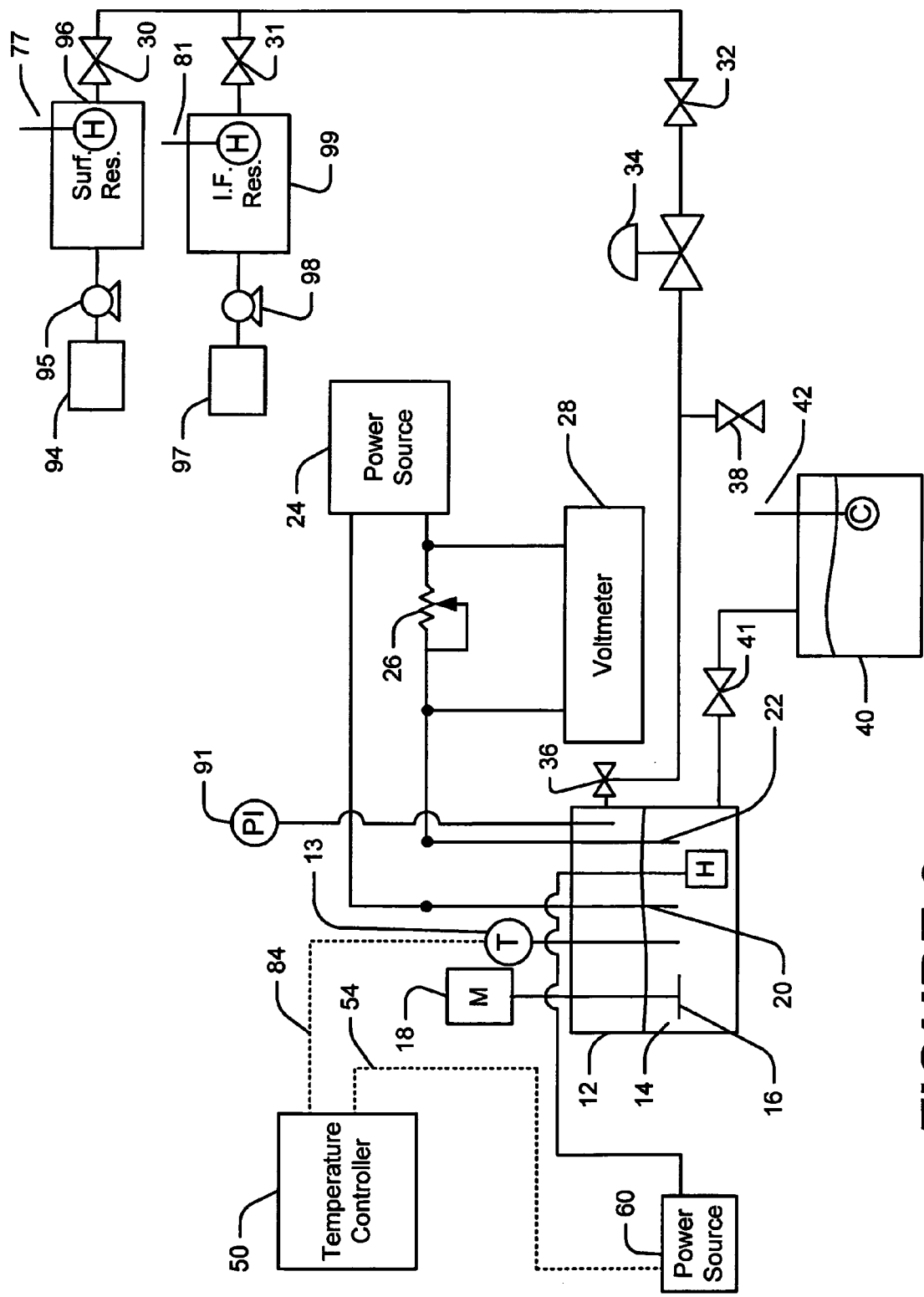
FIG. 3 is a schematic and block diagram for an embodiment of an apparatus of the present invention.

Referring now to FIG. 3, illustrated therein is an alternative embodiment of an apparatus of the present invention. As illustrated in FIG. 3, an inverter fluid reservoir is provided, and depicted by the reference numeral 99. Generally, inverter fluid reservoir 99 is a pressure vessel. In certain embodiments of the present invention, inverter fluid reservoir 99 may be designed to withstand a pressure of at least about 30,000 psi at a temperature of at least about 400 F. In certain other embodiments of the present invention, inverter fluid reservoir 99 may be designed to withstand greater pressures at the same, or greater, temperature. In certain embodiments of the present invention, inverter fluid reservoir 99 may comprise a heating element 81. Inverter fluid reservoir 99 may be pressurized by pump 98, which is supplied with inverter fluid (or another compatible fluid) through reservoir 97. When a quantity of inverter fluid is desired to be introduced into container 12 (which generally will already comprise a drilling fluid to be tested, and which will, in certain embodiments of the present invention, already be at elevated temperature and pressure), valves 31, 32, 34, and 36 may be opened (if each is not already in an open position), and a desired amount of inverter fluid may be introduced into container 12.

As illustrated in FIG. 3, effluent vessel 40 may be provided to receive fluid from flowing out of container 12. Generally, effluent vessel 40 is a pressure vessel. In certain embodiments of the present invention, effluent vessel 40 may be designed to withstand a pressure of at least about 30,000 psi at a temperature of at least about 400 F. In certain other embodiments of the present invention, effluent vessel 40 may be designed to withstand greater pressures at the same, or greater, temperature. Generally, valve 41 may be included in the flow line between effluent vessel 40 and container 12, so as to isolate effluent vessel 40 from container 12 when desired. In certain embodiments of the present invention, effluent vessel 40 may comprise a cooling element 42 (e.g., cooling coils).

Optionally, as illustrated in FIG. 3, a surfactant reservoir may be provided, and depicted by the reference numeral 96. Generally, surfactant reservoir 96 is a pressure vessel. In certain embodiments of the present invention, surfactant reservoir 96 may be designed to withstand a pressure of at least about 30,000 psi at a temperature of at least about 400 F. In certain other embodiments of the present invention, surfactant reservoir 96 may be designed to withstand greater pressures at the same, or greater, temperature. In certain embodiments of the present invention, surfactant reservoir 96 may comprise a heating element 77. Surfactant reservoir 96 may be pressurized by pump 95, which is supplied with surfactant (or another compatible fluid) through reservoir 97. When a quantity of surfactant is desired to be introduced into container 12, valves 30, 32, 34, and 36 may be opened (if each is not already in an open position), and a desired amount of surfactant may be introduced into container 12.

Generally, a calibrating procedure may be performed before the apparatus of the present invention is used. Before a test is run, the voltage or current relative to the potentiometer 26 is measured using the meter 28/28' and only the oleaginous-external/water-internal drilling fluid used as the fluid 14. This reading should be zero since the fluid 14 should be nonconductive. A non-zero reading indicates the instrument is malfunctioning (e.g., an electrical short occurring through the instrument or electrodes 20, 22) or the oleaginous-external/aqueous-internal fluid is contaminated with water in the external phase. Next, the electrical parameter (voltage or current) is measured with only the proposed inverter fluid (e.g., no drilling fluid is present) as the fluid 14. This should give a non-zero reading through the meter 28/28', which corresponds to a maximum voltage drop because the aqueous-based inverter fluid is electrically conductive. The potentiometer 26 can be adjusted until a desired maximum reading is obtained. The potentiometer 26 should not be adjusted after this setting is obtained. Once the zero value of the potentiometer 26 and the maximum span value of the potentiometer 26 have been determined using suitable calibrating fluids, the precise moment when the actual drilling fluid to be tested undergoes an external phase change, or inversion (thus wettability) may be determined.

Generally, the composition of the test oleaginous-external/aqueous-internal fluid may resemble the particular drilling fluid that may be used in the subterranean formation. In certain embodiments of the present invention, the test fluid may be only nominally equivalent to the actual fluid used (or that may be intended to be used) in the formation. As referred to herein, the term "nominally equivalent" will be understood to mean that the test fluid generally has the same composition as the oleaginous-external/aqueous-internal drilling fluid used during the drilling procedure, and that the test fluid generally also may be pre-conditioned to a comparable temperature and pressure to which the actual downhole fluid may be exposed. Though the term "nominally equivalent" includes, but is not limited to, exact identity between the fluids, the term also embraces slight differences in the test fluid and the drilling fluid (e.g., wherein the test fluid and the drilling fluid have different electrolyte contents). In certain embodiments of the present invention wherein the apparatus and methods of the present invention test are used at a well site, the test fluid may comprise a sample of a batch of the drilling fluid to be placed into the well bore.

The initial inverter fluid compositions to be tested against the test oleaginous-external/aqueous-internal fluid may be chosen by experience in dealing with the inverter fluids as known by one skilled in the art, with the benefit of this disclosure.

Generally, the drilling fluid to be used in the test will be preconditioned by increasing its pressure and temperature according to a desired schedule, until the drilling fluid reaches the temperature and pressure to which it is expected to be exposed in the subterranean formation. In certain embodiments of the present invention, this will be the particular well's bottom hole circulating temperature and pressure. In certain embodiments, the preconditioning schedule will approximate the variations in temperature and pressure to which the drilling fluid will be exposed during at least a portion of its passage through the subterranean formation. The drilling fluid may be preconditioned within the apparatus of the present invention, or within any other suitable apparatus. In certain embodiments of the present invention, the various selected fluids to be used in the test (e.g., the drilling fluid, the inverter fluid, and other fluids) may be placed in an apparatus of the present invention, and preconditioned therein by increasing their pressure and temperature according to a desired schedule, until the fluids reach the temperature and pressure to which the determined inverter fluid is expected to be exposed in the subterranean formation (e.g., the particular well's bottom hole circulating temperature and pressure). In certain embodiments, the preconditioning schedule will approximate the variations in temperature and pressure to which the fluids will be exposed during at least a portion of their passage through the subterranean formation. Such preconditioning generally ensures the fluids are stable and all chemicals have been conditioned.

After the calibration procedure described above has been performed on potentiometer 26, and the drilling fluid and/or other fluids to be tested have been preconditioned to a desired extent as described above, the actual testing of the combination of inverter fluid and oleaginous-external/water-internal drilling fluid may be performed, using one or both of two procedures, as well as other suitable procedures. The particular one(s) chosen can be based upon prior knowledge of the drilling fluid system, and the inverter fluids, including the behavior of the various surfactants. During this procedure, viscosity spikes that may occur at specific drilling fluid-to-inverter fluid and drilling fluid-to-surfactant ratios also may be observed and reported.

In one procedure, the drilling fluid to be tested and the selected inverter fluid may be mixed in a desired ratio (e.g., 50:50). The selected inverter fluid may or may not contain one or more surfactants when mixed with the drilling fluid. After the mixture is made homogeneous by mixing with paddle 16, and while stirring of the mixture continues, one or more selected surfactants may be injected into this embodiment of the fluid 14, and the electrical behavior is observed through the response of the meter 28/28'. As the concentration of surfactants increases within this mixture, the reading from the meter 28/28' will start to increase as the surfactants begin to invert the oleaginous-external drilling fluid and clean the surfaces of electrodes 20, 22. During this transition process, when the mixture of the inverter fluid and the drilling fluid is in a bicontinuous phase (often referred to as a Winsor Type III emulsion), the readings from meter 28/28' may fluctuate, dropping to a stable minimum value at equilibrium when the mixture homogenizes and the oil recoats the electrodes. Eventually, the reading from the meter 28/28' will reach a maximum value equal to, or slightly greater than, that recorded for 100% inverter fluid (e.g., wherein drilling fluid is absent) as the fluid 14, thus indicating the electrodes are completely water-wetted and the mixture is 100% water-external (e.g., the drilling fluid has been inverted). The maximum reading may be slightly above that obtained with 100 percent spacer (e.g., due to salts dissolved in the aqueous phase of the drilling fluid). To ensure that inversion has actually occurred, the maximum reading should remain stable for a suitable length of time, such as twenty minutes. If the reading decreases, the appropriate surfactant(s) should again be added and the electrical response monitored until an electrically stable fluid has been obtained. Once the electrically stable fluid has been obtained, the concentration of the injected inverter fluid ingredient(s) (e.g., the one or more surfactants in this example) in the total mixture in the test container 12 may be determined. This total mixture includes the measured initial mixture (e.g., the initial mixture of drilling fluid and inverter fluid, in this example) plus the measured added portion of the injected inverter fluid ingredients (e.g., the one or more surfactants in this example). The concentration of the injected inverter fluid ingredients in only the total inverter fluid itself also may be readily determined. This concentration is readily determined because the volume of inverter fluid in the initial mixture is known and the volume of added inverter fluid ingredients (e.g., surfactants) is known from the injection. The procedure described above is, of course, capable of numerous modifications, including, inter alia, embodiments wherein the testing is performed by mixing the drilling fluid to be tested along with a selected inverter fluid that already comprises a desired amount of surfactants.

In the second, alternative procedure, the inverter fluid initially may be prepared with one or more surfactants. Instead of injecting surfactant into an initial mixture of drilling fluid and inverter fluid, the drilling fluid may be present in container 12 without the inverter fluid, and then an inverter fluid may be injected into the drilling fluid, so as to determine the volume of inverter fluid required to invert the drilling fluid to a desired degree. The reading on the meter 28/28' is observed, and once the maximum reading is obtained for the suitable time period, the electrically stable fluid has been obtained, thereby identifying the ratio of the inverter fluid to the drilling fluid. That is, the total volume of the selected inverter fluid in the initial mixture (if any) and the added further portion of the selected inverter fluid are known or determined and the ratio of the final volume of the inverter fluid to the initial volume of the test oleaginous-external/aqueous-internal fluid in the initial mixture can be determined. The procedure described above is, of course, capable of numerous modifications.

Having used the apparatus of the present invention to determine parameters of the drilling fluid and inverter fluid, a number of determinations may be made. For example, depending on the viscosity profile of the drilling fluid, inverter fluid, and mixtures thereof, it may be desirable to adjust the surfactant such that the inversion from oleaginous-external to water-external occurs at some specified drilling fluid-to-inverter fluid ratio. For example, synthetic drilling fluids typically have a low yield point; therefore, when the phase change occurs, the now water-wetted solids of the drilling fluid may settle severely. This can lead to bridging in downhole casing tools and in the annulus when fluid velocities are insufficient to provide support. This also may lead to annular solids bed deposition on the low side of an inclined or horizontal well bore.

Conversely, some drilling fluid systems viscosify severely when inverted, especially in the presence of an aqueous spacer. Depending on where the viscosity peak occurs, it may be desirable to shift the drilling fluid-to-inverter fluid ratio such that inversion occurs away from the viscosity peak by adjusting the surfactant. The injection procedure wherein one or more surfactants are injected (rather than the entire inverter fluid) is best suited to pinpointing the critical surfactant concentration. Once that surfactant concentration is known, the inverter fluid injection procedure can be repeatedly used with alternate surfactant concentrations to find a drilling fluid-to-spacer ratio where inversion occurs but with a lower viscosity spike.

A properly designed inverter fluid should have adequate rheological properties to support solids released from the drilling fluid system. In the case of a drilling fluid system that loses solids-carrying capacity when it is inverted, it may be more desirable to adjust (typically reduce) the surfactant loading such that a higher percentage of inverter fluid is required to cause the external phase of the resulting mixture to become water-wet. This will result in more solids-carrying capacity, thus reducing the risk of dropping solids as described above.

In one embodiment of a method of the present invention, a method of designing an inverter fluid is provided that comprises designing an inverter fluid that intermixes with the oleaginous-external/aqueous-internal fluid to cause the oleaginous-external/aqueous-internal fluid (or at least a coating of this fluid on the outer surface of the tubular string or on the wall of the well bore) to invert. Designing the inverter fluid includes testing a selected inverter fluid with a test fluid having a composition nominally equivalent to the composition of the oleaginous-external/aqueous-internal fluid.

Once the desired inverter fluid has been designed, certain embodiments of the methods of the present invention further comprise making a quantity of the designed inverter fluid to be placed in the annulus of the well. This quantity is placed in the well for inverting the oleaginous external/aqueous-internal fluid actually in the well on at least a portion of one or more surfaces of the annulus. One technique for placing the inverter fluid includes pumping the quantity of inverter fluid in the well along with a stream of a cement composition such that the present invention also encompasses a method of cementing a well in addition to merely water wetting the well. In this application, the inverter fluid precedes the cement composition such that the pumped inverter fluid displaces at least part of the oleaginous-external/aqueous-internal fluid in the annular region and inverts the coating of oleaginous-external/aqueous-internal fluid sufficient to remove the coating ahead of the cement composition. At least part of the pumped inverter fluid is subsequently displaced by the cement composition to obtain bulk cement displacement, but without an undesirable micro-annulus. Pumping of the fluids is performed in a conventional or otherwise known manner (such as reverse-circulating or reverse cementing, for example).

Another technique for placing the inverter fluid includes pumping the quantity of inverter fluid in the well followed by a quantity of a completion fluid. Examples of completion fluids may include, for example, fresh water, along with aqueous salt solutions (e.g., brines). A broad variety of aqueous salt solutions may be suitable for use as completion fluids in certain embodiments, including, for example, solutions that comprise calcium chloride, sodium chloride, potassium chloride, calcium bromide, zinc bromide, and formate completion brines (e.g., cesium formate, potassium fornate, and the like); other aqueous salt solutions also may be suitable. In this technique, displacing and inverting with the inverter fluid, and ultimately replacing the oleaginous-external fluid and the inverter fluid with the completion fluid prepares the well bore for future operations.

The testing and the making steps referred to above can be performed at the well or elsewhere (e.g., at a laboratory for the former and a manufacturing facility for the latter). The testing is in accordance with further aspects of the present invention described below. Making the designed inverter fluid is performed in a conventional manner given a particular design obtained from the testing of the present invention. For example, in certain embodiments, the aqueous inverter fluid may be prepared at the well site. Mixing water is measured into a field blender. Defoaming agents may be added, followed by a pre-blended dry material comprised of viscosifying agents and selected clays. Barite or other weighting agents may be added to adjust the specific gravity of the inverter fluid to a value usually slightly greater than that of the drilling fluid. Selected surface active agents (surfactants) may be added in sufficient quantity to perform the tasks of inverting the oil-based fluid and leaving well bore surfaces in a water-wet condition.

The process of testing in accordance with the present invention leads to a determination of a particular inverter fluid that can be used for inverting the particular test composition of oleaginous-external/aqueous-internal fluid against which the inverter fluid is tested. In the particular application of displacing and inverting a drilling fluid emulsion in an oil or gas well at the leading end of a stream of a cement composition being pumped into the well, the inverter fluid to be determined is typically in the class of fluids referred to as spacers. Such spacers typically are combined with one or more surfactants to make up the complete inverter fluid.

Figure 4:
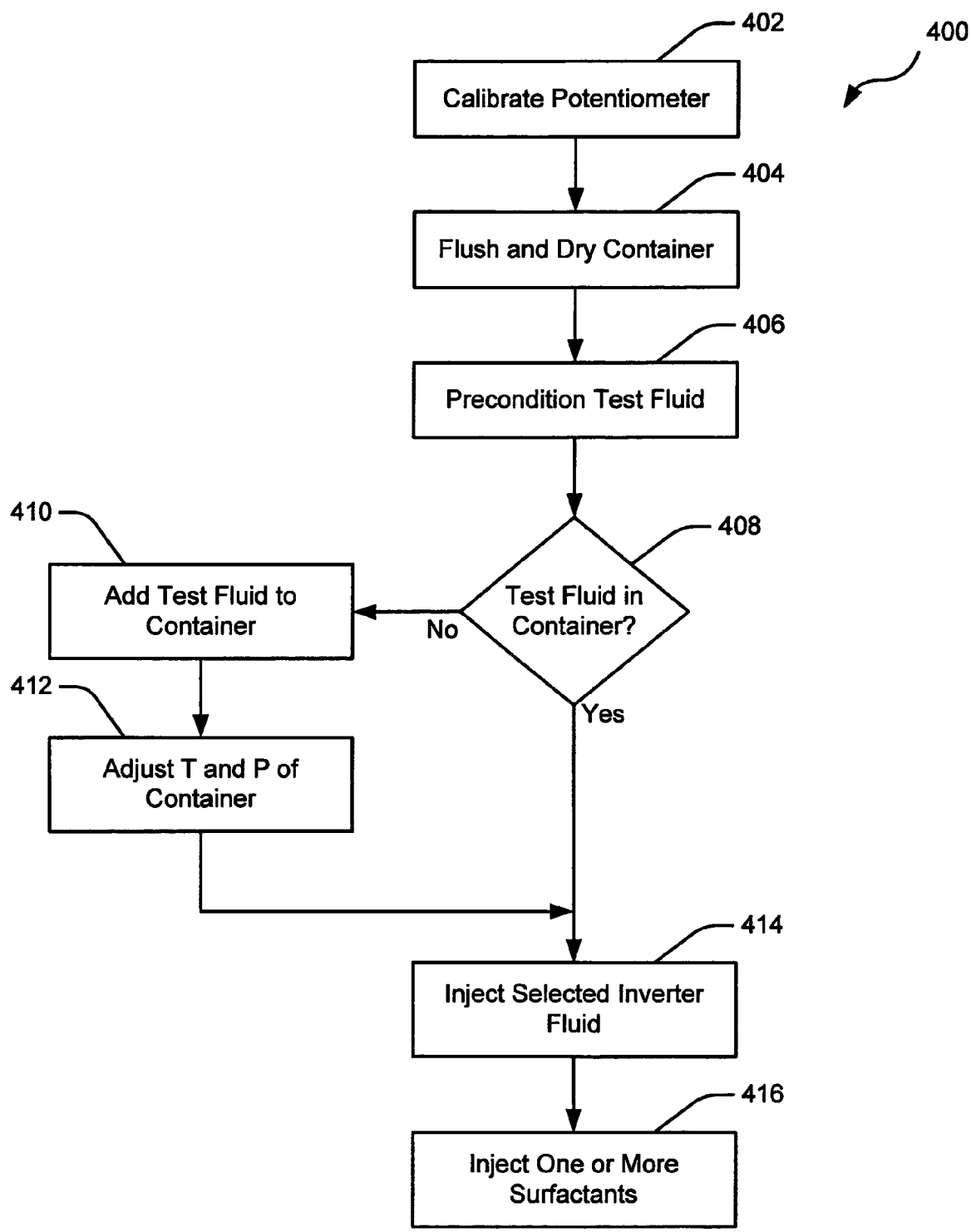
FIG. 4 is a flow chart illustrating an embodiment of a method of the present invention.
Figure 5:
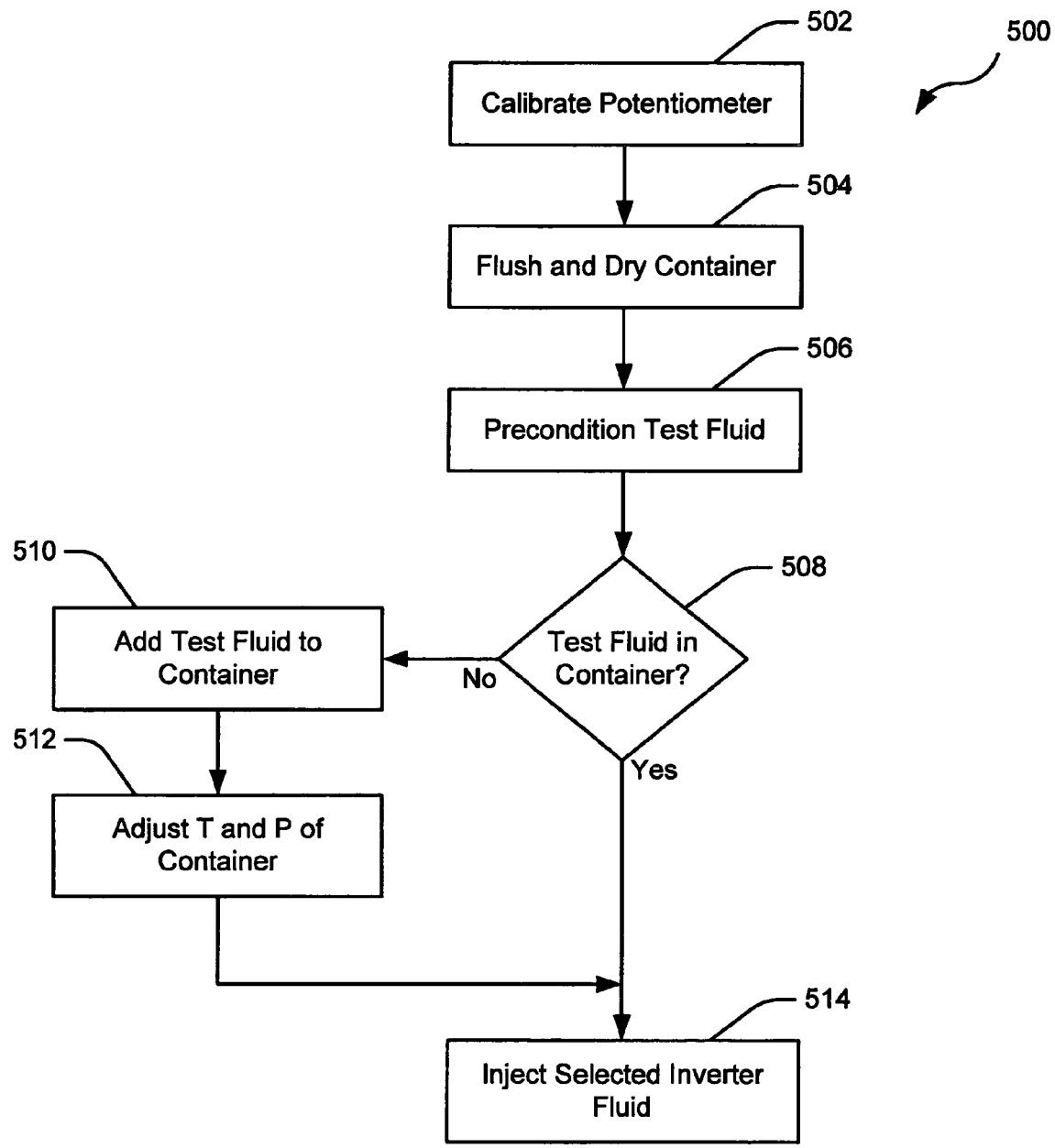
FIG. 5 is a flow chart illustrating an embodiment of a method of the present invention.

FIGS. 4 and 5 illustrate certain embodiments of the methods of the present invention, and now will be described. Referring now to FIG. 4, a flow chart is illustrated that depicts one embodiment of the methods of the present invention, generally referred to as method 400. Method 400 generally comprises determining a composition of an inverter fluid that may invert, to a desired degree, a test fluid that comprises an oleaginous-external/aqueous-internal drilling fluid. In block 402, a potentiometer (e.g., potentiometer 26 of FIG. 2) may be calibrated. Calibration of potentiometer 26 should be performed as discussed above. Subsequent to calibration of the potentiometer, container 12 may be flushed (e.g., with water) and allowed to dry, as depicted in block 404 of FIG. 4. Container 12 may be flushed and dried, in some embodiments, so that any residue of the inverter fluid and/or the test fluid may be removed from the surfaces of electrodes 20, 22.

In block 406, the test fluid is preconditioned. Those of ordinary skill in the art will appreciate that preconditioning of the test fluid may be performed prior to, simultaneously with, or subsequent to the steps depicted in blocks 402 and 404. Preconditioning of the test fluid should be performed as discussed above. For example, in some embodiments, preconditioning of the test fluid may comprise utilizing high temperature, high pressure equipment that is separate from the apparatus of the present invention. In other embodiments, preconditioning of the test fluid may occur in container 12 of an apparatus of the present invention depicted in FIG. 1. Preconditioning of the test fluid may occur in container 12, for example, to ensure that meter 28/28' reads zero.

As depicted in block 408, a determination may be made as to whether preconditioning of the test fluid occurred in container 12. If preconditioning of the test fluid did occur in container 12, the execution of the method 400 moves to block 414. If preconditioning of test fluid did not occur in container 12, the test fluid should be added to container 12, as depicted in block 410. Once in container 12 the temperature and pressure of container 12 should be adjusted, as depicted in block 412, to the temperature and pressure that the oleaginous-external/aqueous-internal fluid that is being tested will encounter in the subterranean formation.

In block 414 of FIG. 4, an initial mixture may be prepared by injecting a selected inverter fluid into container 12 while mixing, until a desired ratio of inverter fluid to test fluid (e.g., a 50:50 ratio) is obtained. As previously discussed, the inverter fluid may or may not contain surfactants. Furthermore, as discussed above, once the desired ratio of the inverter fluid to the test fluid is obtained, one or more selected surfactants should be injected into the initial mixture, as depicted in block 16, until inversion of the test fluid has been detected based on the measured electrical parameters. Once inversion has occurred, a composition of a desired inverter fluid may be determined because the volume and composition of the inverter fluid in the initial mixture is known, as well as the amount of the one or more selected surfactants that were injected into the initial mixture.

Referring now to FIG. 5, a flow chart is illustrated that depicts another embodiment of the methods of the present invention, generally referred to as method 500. Method 500 generally comprises determining a composition of an inverter fluid that may invert, to a desired degree, a test fluid that comprises an oleaginous-external/aqueous-internal drilling fluid. In block 502, a potentiometer (e.g., potentiometer 26 of FIG. 2) may be calibrated. Calibration of potentiometer 26 should be performed as discussed above. Subsequent to calibration of the potentiometer, container 12 may be flushed (e.g., with water) and allowed to dry, as depicted in block 504 of FIG. 5. Contained 12 may be flushed and dried, in some embodiments, so that any residue of the inverter fluid and/or the test fluid may be removed from the surfaces of electrodes 20, 22.

In block 506, the test fluid is preconditioned. Those of ordinary skill in the art will appreciate that preconditioning of the test fluid may be performed prior to, simultaneously with, or subsequent to the steps depicted in blocks 502 and 504. Preconditioning of the test fluid should be performed as discussed above. For example, in some embodiments, preconditioning of test fluid may comprise utilizing high temperature, high pressure equipment that is separate from the apparatus of the present invention. In other embodiments, preconditioning of the test fluid may occur in container 12 of an apparatus of the present invention depicted in FIG. 1. Preconditioning of the test fluid may occur in container 12, for example, to ensure that meter 28/28' reads zero.

As depicted in block 508, a determination may be made whether preconditioning of the test fluid occurred in container 12. If preconditioning of the test fluid did occur in container 12, the execution of the method 500 moves to block 514. If preconditioning of test fluid did not occur in container 12, the test fluid should be added to container 12, as depicted in block 510. Once in container 12 the temperature and pressure of container 12 should be adjusted, as depicted in block 512, to the temperature and pressure that the oleaginous-external/aqueous-internal fluid that is being tested will encounter in the subterranean formation.

In block 514 of FIG. 5, a selected inverter fluid may be injected into container 12 while mixing. In this embodiment, the selected inverter fluid should contain the desired concentration of the one or more surfactants. As discussed above, by observation of meter 28/28' during injection of the selected inverter fluid a desirable ratio of the selected inverter fluid to the test fluid may be identified, wherein the ratio is capable of achieving the desired inversion of the oleaginous-external/aqueous-internal drilling fluid that was used as the test fluid. In another embodiment, a selected inverter fluid may be injected into container 12 to determine the compatibility of the selected inverter fluid and the test fluid. The selected inverter fluid may be injected into container 12 until a desired ratio of inverter fluid to test fluid is obtained. Once the desired ratio is obtained, observation of meter 28/28' will allow determination of the compatibility of the selected inverter fluid and the test fluid at the desired ratio. In certain embodiments, the step of adjusting the temperature and pressure of container 12 in block 512 may not occur until the desired ratio of the selected inverter fluid and the test fluid is obtained by injection of the selected inverter fluid into container 12.

To facilitate a better understanding of the present invention, the following example of a preferred embodiment is given. In no way should the following example be read to limit, or to define, the scope of the invention.

EXAMPLE

Figure 6:
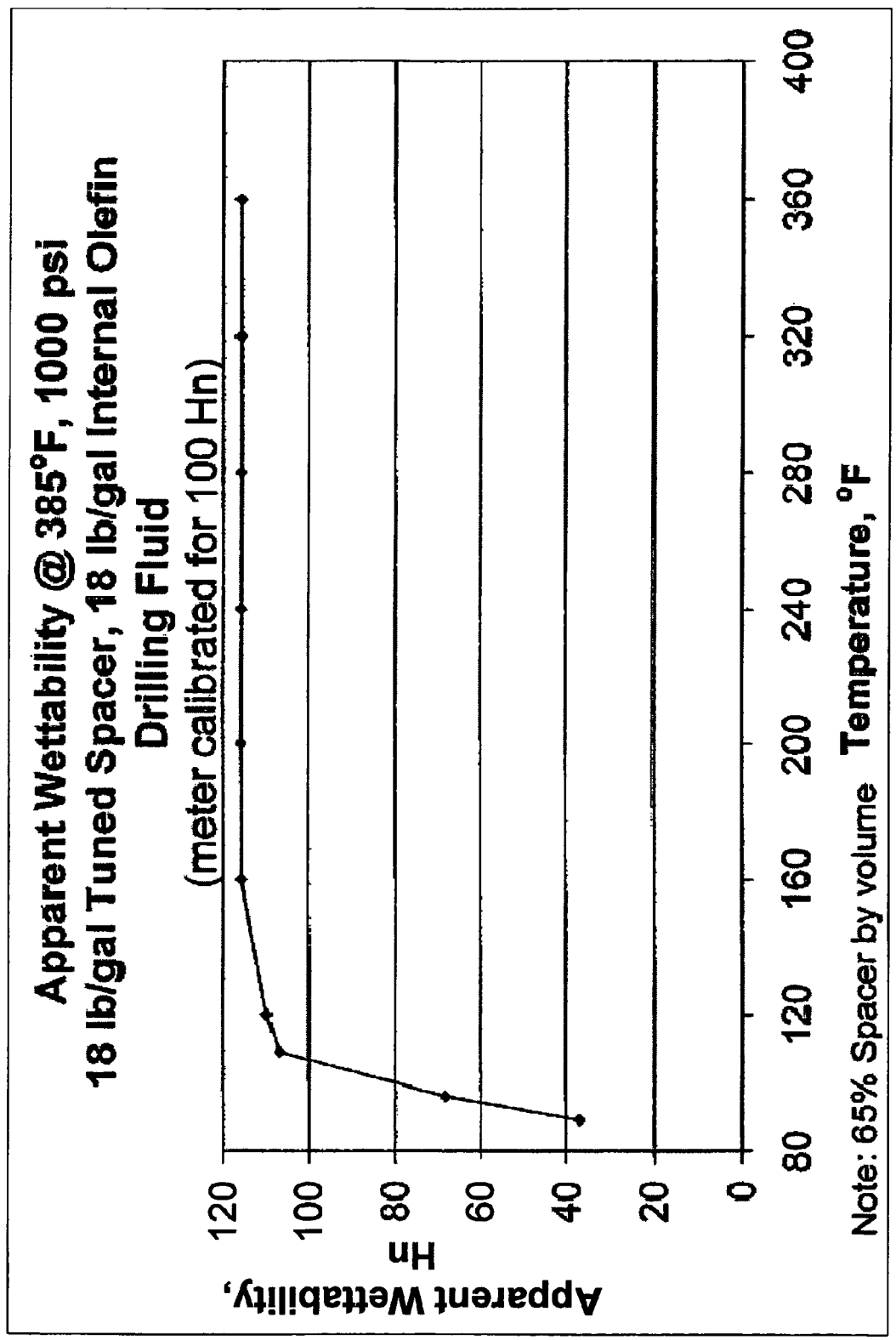
FIG. 6 is a graph of the apparent wettability of a fluid determined through the use of an apparatus and method of the present invention.

The graph in FIG. 6 shows an example of the apparent wettability (a dimensionless value) demonstrated by a fluid comprising 65% by volume of a spacer fluid, and 35% by volume of a drilling fluid comprising an internal olefin. The spacer fluid comprised 18 pounds per gallon TUNED SPACER, plus 0.6 gallons per barrel each of CLEANBORE A surfactant, SEM-8 surfactant, and AS-5 anti-sludging agent, all of which are commercially available from Halliburton Energy Services, Inc., of Duncan, Okla. The drilling fluid comprising an invert emulsion comprised an external phase of $C_{16}$–$C_{18}$ internal olefin, primary and secondary emulsifiers, and barite; the internal phase comprised a calcium chloride brine having a specific gravity of 1.23. Both the spacer fluid and the drilling fluid had a density of 18 pounds per gallon. In the graph of FIG. 6, the fluid mixture remained in a water-wetted state under high temperature, high pressure conditions, as temperature increased.

Therefore, the present invention is well adapted to carry out the objects and attain the ends and advantages mentioned as well as those which are inherent therein. While the invention has been depicted and described by reference to embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An apparatus for evaluating fluids, comprising:
   a sealed vessel comprising:
      a shell having an upper end and a lower end;
      an upper head affixed to the upper end;
      and a lower head affixed to the lower end;
   a mixing means disposed within the vessel such that at least a portion of the mixing means is immersed within a fluid disposed within the vessel;
   a pressure controlling means comprising:
      a pressure sensing means capable of converting the pressure within the vessel to a signal;
      a pressure adjusting means capable of changing the pressure within the vessel; and
      a controlling means in signal communication with the pressure sensing means and the pressure adjusting means, wherein the controlling means commands the pressure adjusting means in response to signals from the pressure sensing means;
   a temperature controlling means comprising:
      a temperature sensing means capable of converting the temperature of a fluid disposed within the vessel to a signal;
      a heating means capable of changing the temperature of the fluid disposed within the vessel; and
      a controlling means in signal communication with the temperature sensing means and the heating means, wherein the controlling means commands the heating means in response to signals from the temperature sensing means;
   a conductivity measuring means capable of converting the conductivity of a fluid disposed within the vessel to a signal that enables an operator to evaluate the fluid.

2. The apparatus of claim 1, further comprising a fluid supply and an injection means for injecting a fluid into the vessel, the fluid supply being in fluid communication with the injection means, the injection means being in fluid communication with the vessel.

3. The apparatus of claim 2, wherein the fluid to be injected is an inverter fluid.

4. The apparatus of claim 2, wherein the fluid to be injected comprises water.

5. The apparatus of claim 2, wherein the fluid to be injected comprises a surfactant.

6. The apparatus of claim 2, wherein:
   a first fluid is disposed within the vessel;
   the fluid supply comprises a volume of a second fluid; and
   the injection means is capable of injecting the second fluid into the vessel.

7. The apparatus of claim 6, wherein the first fluid comprises an oleaginous-external/aqueous-internal emulsion.

8. The apparatus of claim 7, wherein the second fluid is an inverter fluid or a surfactant.

9. The apparatus of claim 6, wherein the first fluid comprises an inverter fluid and an oleaginous-external/aqueous-internal emulsion.

10. An apparatus for evaluating fluids, comprising:
a vessel comprising:
a shell having an upper end and a lower end;
an upper head affixed to the upper end;
and a lower head affixed to the lower end;
a mixer disposed within the vessel such that at least a portion of the mixer is immersed within a fluid disposed within the vessel;
a pressure controller comprising:
a pressure sensor capable of converting the pressure within the vessel to a signal;
a pressure adjuster capable of changing the pressure within the vessel; and
a controller in signal communication with the pressure sensor and the pressure adjuster, wherein the controller commands the pressure adjuster in response to signals from the pressure sensor;
a temperature controller comprising:
a temperature sensor capable of converting the temperature of a fluid disposed within the vessel to a signal;
a heating element capable of changing the temperature of the fluid disposed within the vessel; and
a controller in signal communication with the temperature sensor and the heating element, wherein the controller commands the heating element in response to signals from the temperature sensor; and
a conductivity sensor disposed within the vessel such that at least a portion of the conductivity sensor is immersed within a fluid disposed within the vessel, the conductivity sensor being capable of converting the conductivity of a fluid disposed within the vessel to a signal that enables an operator to evaluate the fluid.

11. The apparatus of claim 10, further comprising a fluid supply and a pump for injecting a fluid into the vessel, the fluid supply being in fluid communication with the pump, the pump being in fluid communication with the vessel.

12. The apparatus of claim 11, wherein the fluid to be injected is an inverter fluid.

13. The apparatus of claim 11, wherein the fluid to be injected comprises a surfactant.

14. The apparatus of claim 11, wherein the fluid to be injected comprises water.

15. The apparatus of claim 11, wherein:
a first fluid is disposed within the vessel;
the fluid supply comprises a volume of a second fluid; and
the pump is capable of injecting the second fluid into the vessel.

16. The apparatus of claim 15 wherein the first fluid comprises an oleaginous-external/aqueous-internal emulsion.

17. The apparatus of claim 16 wherein the second fluid is an inverter fluid or a surfactant.

18. The apparatus of claim 15 wherein the first fluid comprises an inverter fluid and an oleaginous-external/aqueous-internal emulsion.

19. A system for inverting an oleaginous-external/aqueous-internal fluid in a well bore in a subterranean formation, comprising:
a test apparatus for evaluating inverter fluids, the test apparatus comprising:
a vessel comprising
a shell having an upper end and a lower end;
an upper head affixed to the upper end;
and a lower head affixed to the lower end;
a mixer disposed within the vessel such that at least a portion of the mixer is immersed within a fluid disposed within the vessel;
a pressure controller comprising
a pressure sensor capable of converting the pressure within the vessel to a signal;
a pressure adjuster capable of changing the pressure within the vessel; and
a controller in signal communication with the pressure sensor and the pressure adjuster, wherein the controller commands the pressure adjuster in response to signals from the pressure sensor;
a temperature controller comprising;
a temperature sensor capable of converting the temperature of a fluid disposed within the vessel to a signal;
a heating element capable of changing the temperature of the fluid disposed within the vessel; and
a controller in signal communication with the temperature sensor and the heating element, wherein the controller commands the heating element in response to signals from the temperature sensor; and
a conductivity sensor disposed within the vessel such that at least a portion of the conductivity sensor is immersed within a fluid disposed within the vessel, the conductivity sensor being capable of converting the conductivity of a fluid disposed within the vessel to a signal that enables an operator to evaluate the fluid;
a fluid supply that comprises an inverter fluid, the inverter fluid composition having been chosen by an operator using the test apparatus; and
a pump to inject the inverter fluid into a well bore in a subterranean formation so as to invert an oleaginous-external/aqueous-internal fluid disposed in the well bore, the pump being in fluid communication with the fluid supply and the well bore.

20. The system of claim 19 wherein the fluid disposed within the vessel comprises an inverter fluid and an oleaginous-external/aqueous-internal fluid.

* * * * *